June 2, 1959  K. L. HERTEL  2,888,823
APPARATUS FOR TESTING COMPRESSIBLE FIBROUS MATERIALS
Filed Feb. 13, 1956  6 Sheets-Sheet 3

INVENTOR
Kenneth L. Hertel.

BY Stone, Boyden & Mack,

ATTORNEYS

June 2, 1959 K. L. HERTEL 2,888,823
APPARATUS FOR TESTING COMPRESSIBLE FIBROUS MATERIALS
Filed Feb. 13, 1956 6 Sheets-Sheet 6
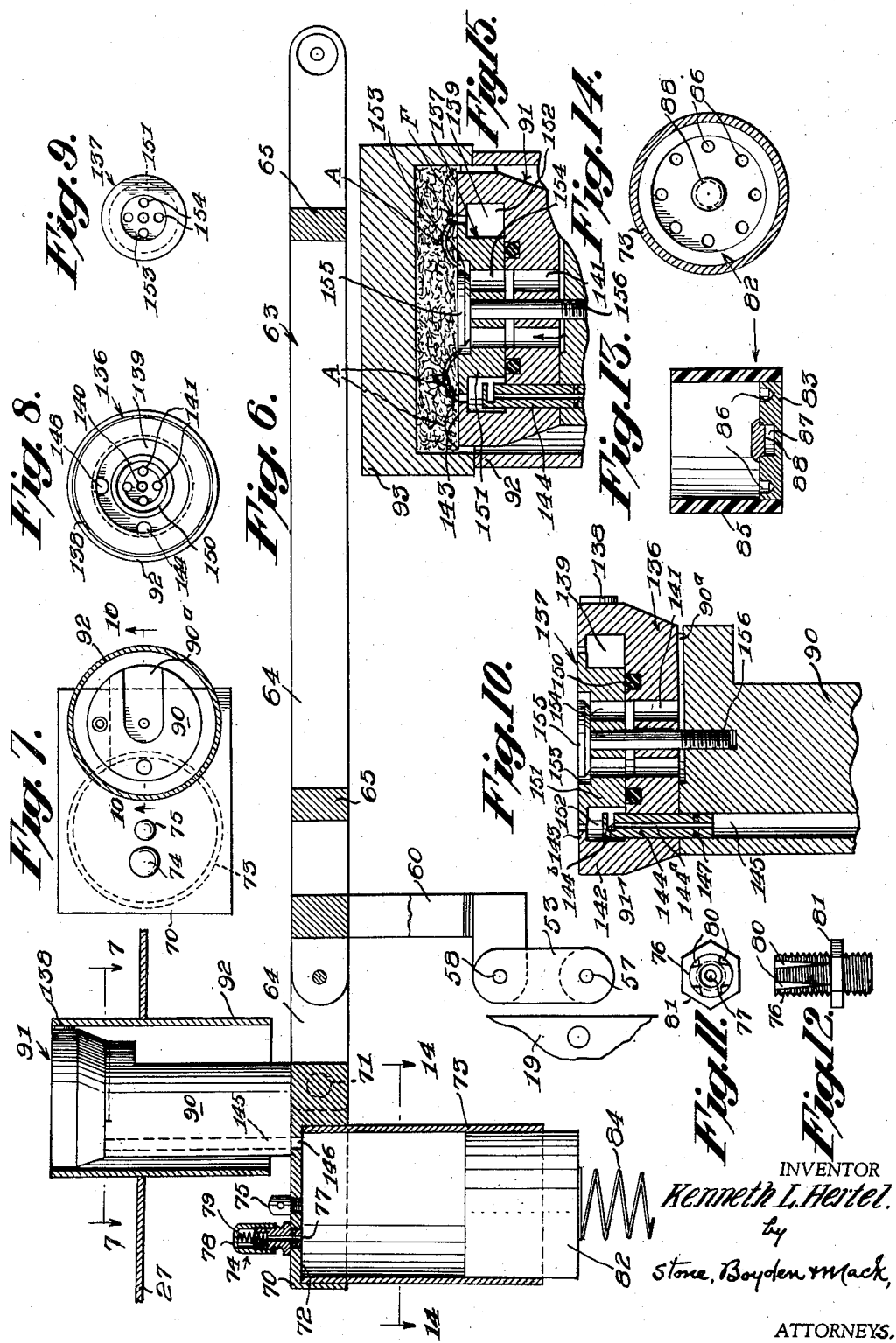
INVENTOR
Kenneth L. Hertel.
by
Stone, Boyden & Mack,
ATTORNEYS.

United States Patent Office 2,888,823
Patented June 2, 1959

2,888,823

APPARATUS FOR TESTING COMPRESSIBLE
FIBROUS MATERIALS

Kenneth L. Hertel, Knoxville, Tenn., assignor to University of Tennessee Research Corporation, Knoxville, Tenn., a corporation of Tennessee Application February 13, 1956, Serial No. 565,119

13 Claims. (Cl. 73—38)

This invention relates to apparatus for measuring the resistance to fluid flow offered by masses of porous materials, and more particularly masses of compressible fibrous materials.

In my prior Patents Nos. 2,352,835 and 2,352,836, issued July 4, 1944, and my prior Patent No. 2,706,904, issued April 26, 1955, I have disclosed methods of and apparatus for measuring the resistance to fluid flow offered by such masses or samples for the purpose of determining the factors of "fineness" as modified by the factor of immaturity of the fibers, or as modified by another factor related to the property of stiffness of the fibers.

One of the objects of the present invention is to devise means for measuring and indicating separately and independently both the factor of "fineness" and a factor related to the property of stiffness or compressibility.

In the present invention, I cause fluid to flow through the compressed sample along a path substantially the same as shown and described in the most recent of the above mentioned patents, and, as in said patent, I avoid the necessity of using samples of any precise, definite weight. In said prior patent, however, I achieved this result by applying to the sample, whatever its mass, a constant compressive force, so that the force applied to all samples was the same. In the present invention, I accomplish the desired result by compressing the sample to an extent strictly proportional in every case to its weight, so that the volume of the compressed mass varies with its weight, and its density is the same for all samples.

This is done by adjusting the size of the compression chamber in accordance with the weight of the sample, such adjustment being made before introducing the sample into the chamber, and in advance of the compressing operation.

The invention therefore contemplates improved means by which the size of the compression chamber may be adjusted, in exact proportion to the weight of the sample, so that the density of the compressed mass is constant.

More specifically, the invention includes a compression chamber in the form of a cylinder, with a piston working freely therein, and the size or capacity of this chamber is adjusted as desired by pre-setting the piston in the required position before the sample is introduced into the chamber and before the compressive stroke takes place. Thereafter, the piston is given a compressive stroke, the length of which is the same for all samples, regardless of their weight.

Another object of the invention is to devise a self-contained apparatus of the character described, in which no connection with a source of electric power, or with a source of fluid under pressure is required. To this end, I provide means by which the necessary fluid pressure difference is generated solely by the movement of a free, gravity-actuated piston, operating in a cylinder, no pump of any kind being employed.

With the above and other objects in view, and to provide apparatus in which tests of successive samples can be made accurately, easily, and with great rapidity, the invention consists in the construction, combination and arrangement of parts hereinafter described and claimed, and illustrated in the accompanying drawings, forming part of this specification, and in which:

Figure 4a is a fragmentary rear elevation of a portion of the handle;

Figure 6 is a vertical sectional view substantially in the plane of line 5—5 extended and showing in particular the piston operating beam, the piston together with the stationary cylinder in which it reciprocates and also the beam operable cylinder;

Figure 7 is a horizontal sectional view as observed in the plane of line 7—7 of Figure 6;

Figure 8 is a top plan view of the outer portion of an air distributing member;

Figure 9 is a top plan view of the inner portion of the air distributing member;

Figure 10 is an enlarged fragmental vertical sectional view as observed in the plane of line 10—10 of Figure 7;

Figure 11 is a top plan view of a rate valve body;

Figure 12 is a side elevational view of said rate valve body;

Figure 13 is a diametrical vertical sectional view of a dead weight or gravity piston embodied in the device;

Figure 14 is a horizontal sectional view as observed in the plane of line 14—14 of Figure 6; and Figure 15 is an enlarged, fragmentary, vertical section through the upper end of the compression cylinder, showing the lid closed, and the compressed sample in position therein.

Figure 1:
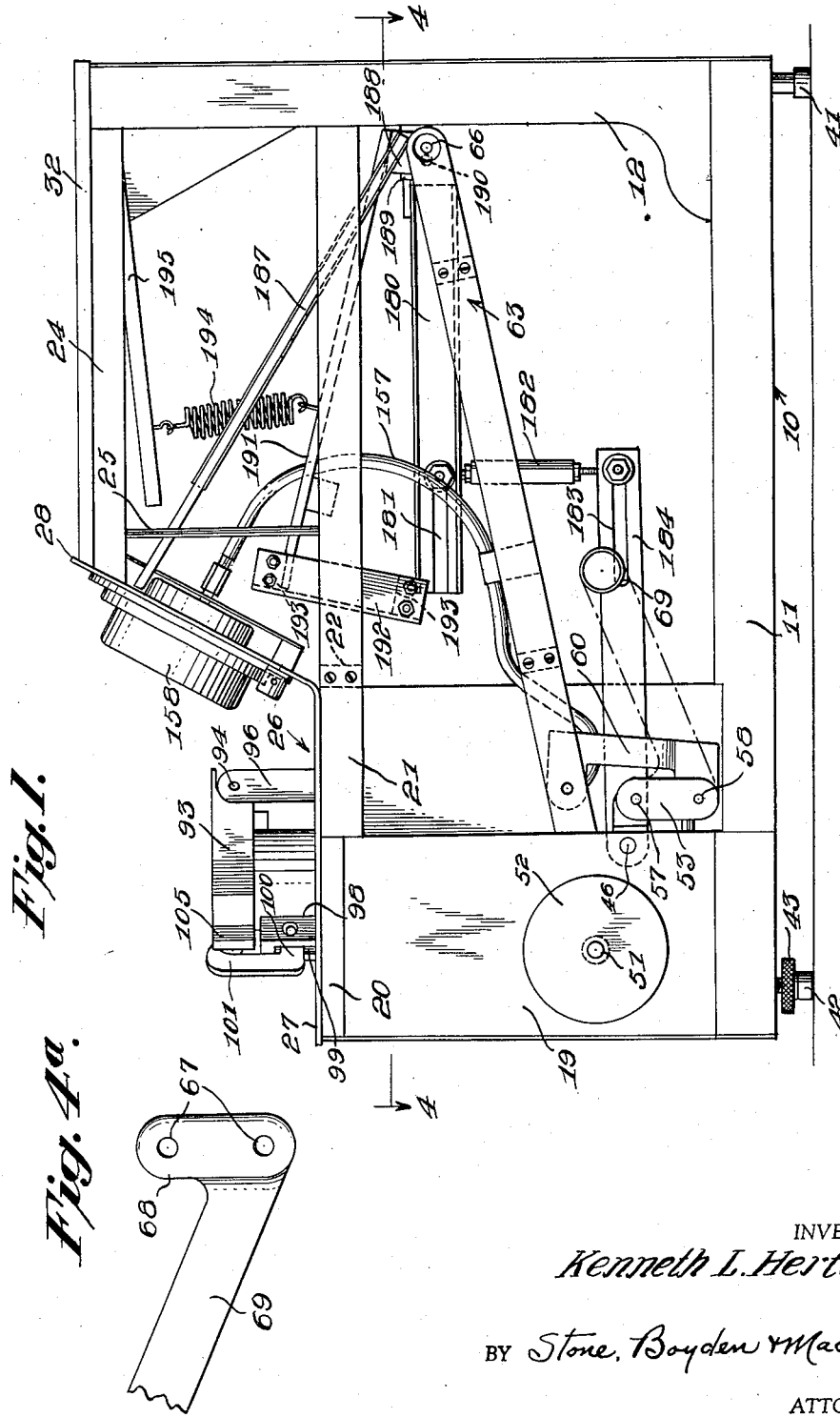
Figure 1 is a side elevational view of the device with one of the side panels removed.

Referring now in detail to the drawings, the improved instrument comprises a suitable frame 10 which generally includes a rectangular base 11, a plurality of vertical members 12, 13 and 14 at the rear of the frame and a pair of vertical members 15 and 16 at one side of the frame and adjacent the front end thereof.

The base 11 is open at the front end for a portion of the width of the frame as indicated at 17 and a pair of laterally spaced vertical plates 18 and 19 project upwardly from the base and whose upper ends are connected by a horizontal plate 20.

The frame 10 further includes an upper horizontal member 21 at each side thereof, the rear ends of which are connected to the respective vertical members 12 and 14 and the front end of one thereof engages the rear edge of plate 20 and the front end of the other thereof rests upon the upper end of the vertical member 16. The said horizontal side members 21 are interconnected by a transverse member 22.

The said vertical frame members 12, 13 and 14 project substantially above the said side members 21 and the upper ends thereof are interconnected by a horizontal member 23 and a horizontal member 24 extends forwardly from the upper end of each member 12 and 14 to a position substantially intermediate the ends of the frame with the forward ends thereof each being supported by a rod 25 from the horizontal member 21 therebelow.

A relatively heavy gauge sheet metal panel 26 is disposed on top of the frame 10 at the front end thereof and same includes a horizontal portion 27 which is removably secured to members 21 and plate 20 and a portion 28 in substantially 120° relation to the portion 27 and whose upper edge is secured to the forward ends of members 24.

Figure 4:
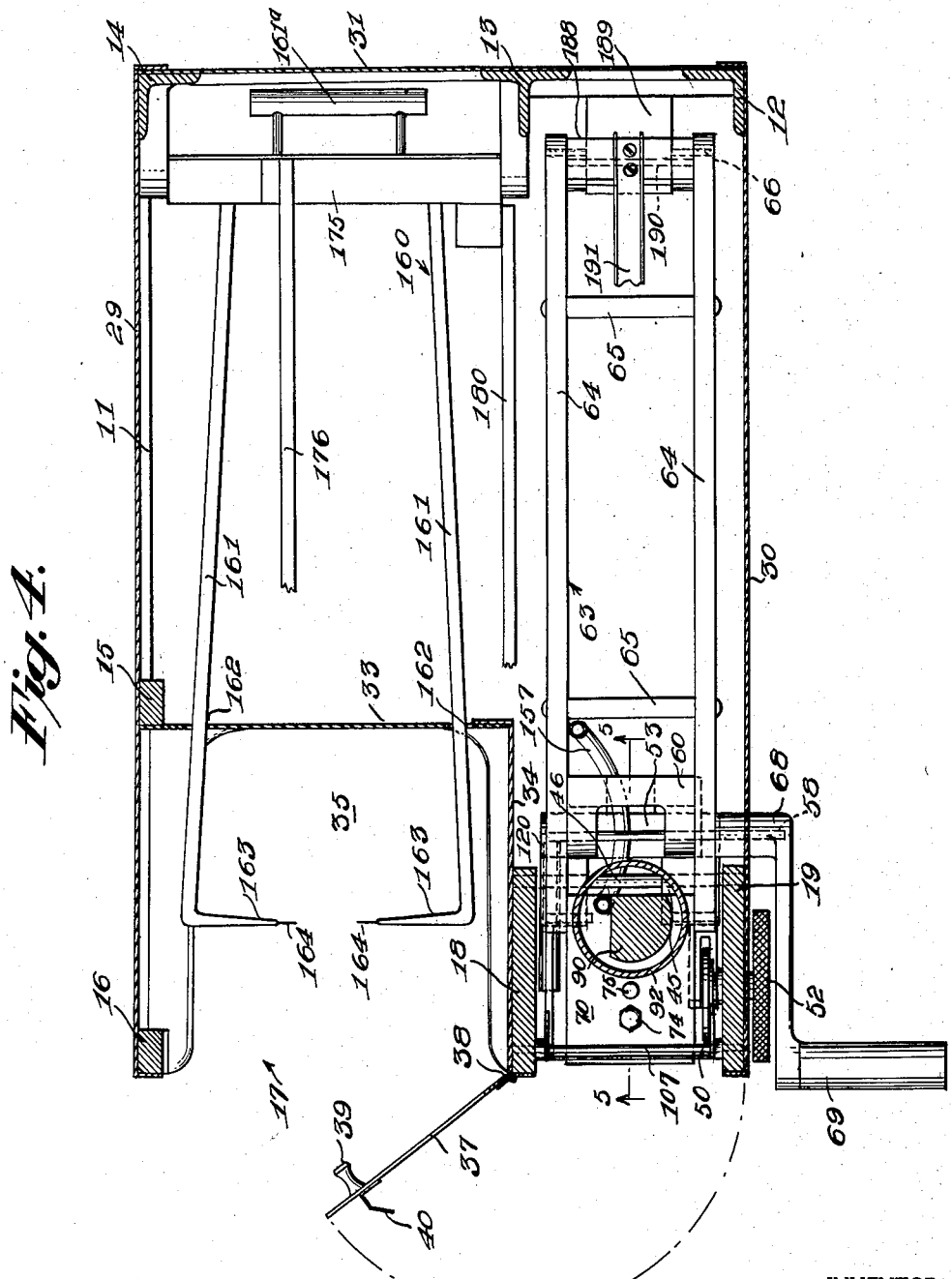
Figure 4 is a horizontally sectional view substantially in the plane of line 4—4 of Figure 1 with the device in fiber compressing position.

The frame as above described is provided with suitable removable cover panels for the opposite sides, rear end and top thereof whereby the operating mechanism is normally substantially concealed within a housing. The opposite side panels are indicated in Figure 4 and are designated 29 and 30 and the rear panel which is indicated in the same figure is designated 31.

The top panel is indicated in Figure 1 and is designated 32.

A vertically disposed sheet metal panel 33 spans the space between member 15 and the plate 18 and a further vertical sheet metal panel is disposed in right angular relation to panel 33 and is suitably secured to plate 18.

The panels 33 and 34 in cooperation with adjacent portions of side panel 29 and panel portion 27 provide an open front weighing compartment 35 for a purpose later to appear.

Furthermore, the plates 18, 19 and 20 provide a forwardly and rearwardly opening compression compartment 36, the otherwise open front of which is provided with a door 37 having a vertical hinge connection 38 with the front vertical edge of plate 18 and which is provided with a finger engageable knob 39 and a spring catch 40, the door being swingable in the arc indicated by dotted line in Figure 4 to and from a closing position at the front of compartment 36.

Figure 2:
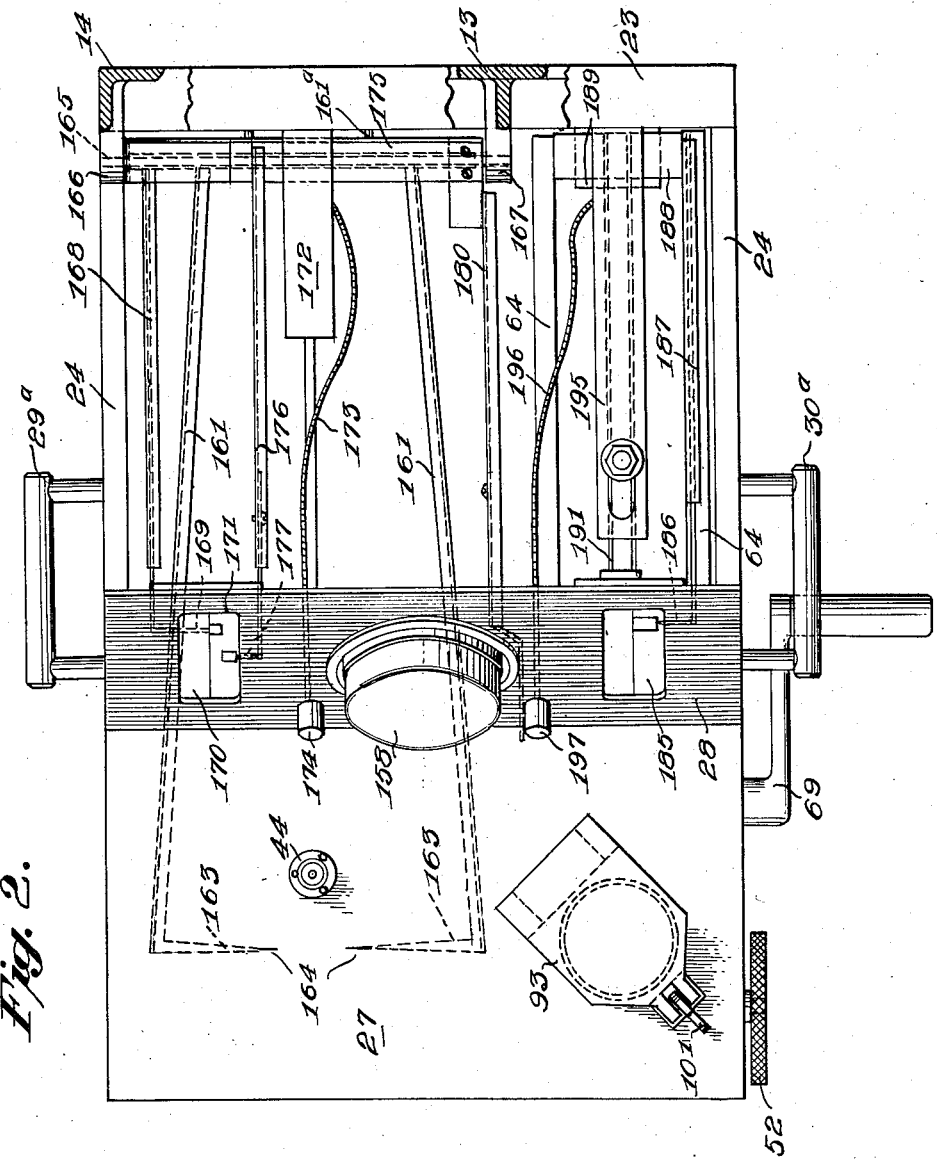
Figure 2 is a top plan view of the device with the top panel removed and wherein certain parts are broken away and in section.

The base 11 of the frame 10 is provided with a support adjacent each corner thereof and which preferably comprises a rubber foot 41 at each rear corner and a rubber foot 42 adjacent each front corner, the latter being provided with a knurled adjusting disc 43 whereby the frame is capable of being accurately leveled as is determined by the level gauge 44 supported in the panel portion 27. The side panels 29 and 30 are preferably each provided with a handle 29a and 30a respectively (Figure 2).

Inasmuch as the weighing mechanism has an operative association with the compression mechanism, the latter will be first described.

A bearing member 45 is adjustably supported on a shaft 46 whose opposite ends are fixed in the plates 18 and 19. The bearing member is provided with a forward extension 47 adjacent the plate 19 and which is provided with a channel 48 opening through its upper side and its free end. A pin 49 spans the channel adjacent said free end with which is engaged a cam 50 whose eccentric shaft 51 is rotatably supported in and extends to a position exteriorly of the plate 19 and a knurled hand wheel 52 is removably engaged with the shaft for imparting fore and aft rotation thereto.

A member 53 including a central bar 54 and a pair of pivot lugs at one side thereof and a like pair of pivot lugs 56 at the opposite side thereof has the lugs 55 pivotally connected to the rear end of the bearing member 45 as by means of a pivot pin 57 and the pivot lugs 56 are pivotally connected by means of a pin 58 to the lower laterally spaced lugs 59 of a link 60 whose upper laterally spaced lugs 61 are pivotally secured as at 62 to the front end of a longitudinally extending beam 63 including a pair of parallel side bars 64 and a pair of transverse connecting bars 65 intermediate the ends thereof. The side plate 19 is provided with a stop member 19a which is engaged by member 53 in its lower position and the link 60 is provided with a stop 60a which is engaged by an ear 54a projecting from bar 54.

The rear ends of the side bars 64 are pivotally connected as by means of pins 66 to a stirrup later referred to. The member 53 and the link 60 have a toggle action whereby the member 53 is rotatable through an arc of 180° between the solid line and dotted line positions in Figure 5 and when in this latter position the link 60 is lowered as in Figure 1 with the forward end of beam 63 lowered whereas in the first position of the link the forward end of the beam is raised and wherein the beam is substantially in a horizontal position.

The pivot pins 57 and 58 above referred to project outwardly from the outer side of member 53 as indicated in Figure 1 for reception within corresponding apertures in the hub 68 of an operating handle 69 upon swinging of which the forward end of beam 63 is raised and lowered for a purpose later to appear. The forward ends of the beam side members 64 extend into the compartment 36 and same are pivotally connected to opposite sides of a rectangular block 70 adjacent the rear end thereof, as indicated at 71 in Figure 6. The block 70 is counter bored from its lower face to provide a circular recess 72 in which is removably received the upper end of a cylinder 73 and the top wall of said recess is provided with an adjustable rate valve 74 and a relief valve 75.

The relief valve 75 is of well known construction. The rate valve 74 is preferably of a structure including an externally threaded shank 76 having an axial aperture 77 and an internally threaded cap 78 between which and the upper end of said shank is disposed a coil spring 79.

The threaded shank as indicated in Figures 11 and 12 is provided with a plurality of longitudinal grooves 80 which taper both in width and depth from the outer end of the shank to the hexagonal turning head 81 thereon with the wider and deeper ends of the grooves being at the outer end of the shank, whereby the passage of air through the valve is regulatable upon turning the cap 78.

A cup form dead-weight or gravity piston 82 is freely disposed within the cylinder 73 having its bottom wall 83 engageable with the upper end of a vertically disposed coil spring 84 whose lower end is suitably secured to the base of the frame.

The dead weight piston 82 preferably comprises a composition wall 85 and the metallic bottom wall 83 may be provided with a circumferential series of weight reducing recesses 86 and a relatively larger central recess 87 which may remain void or be provided with one of several different magnitude weights 88 for a purpose later to appear.

Rigidly secured to the upper face of the block 70 in rearward axially displaced relation to the recess 72 is the lower end of a vertically disposed piston 90 to the upper end of which is removably secured air distributing means 91 hereinafter more specifically referred to.

The piston 90 and therewith the said means 91 are reciprocable within a cylinder 92 which extends through and projects from both the lower and upper faces of the panel portion 27 and the cylinder is supported in such panel portion in rigid relation thereto.

The piston 90 is moved downward within the cylinder 92 upon rearward swinging of the handle 69 and is moved upward upon forward swinging of the handle.

As will be later more fully referred to, the cylinder 92 is adapted to receive a mass of fibers to be tested when the piston 90 is in lowered position.

The fibers are supportable on the upper face of said air distributing means 91 and since it is the purpose of the instrument to compress such mass, same must also be engageable with means opposing said means 91 upon the upward stroke of the piston 90.

Figure 3:
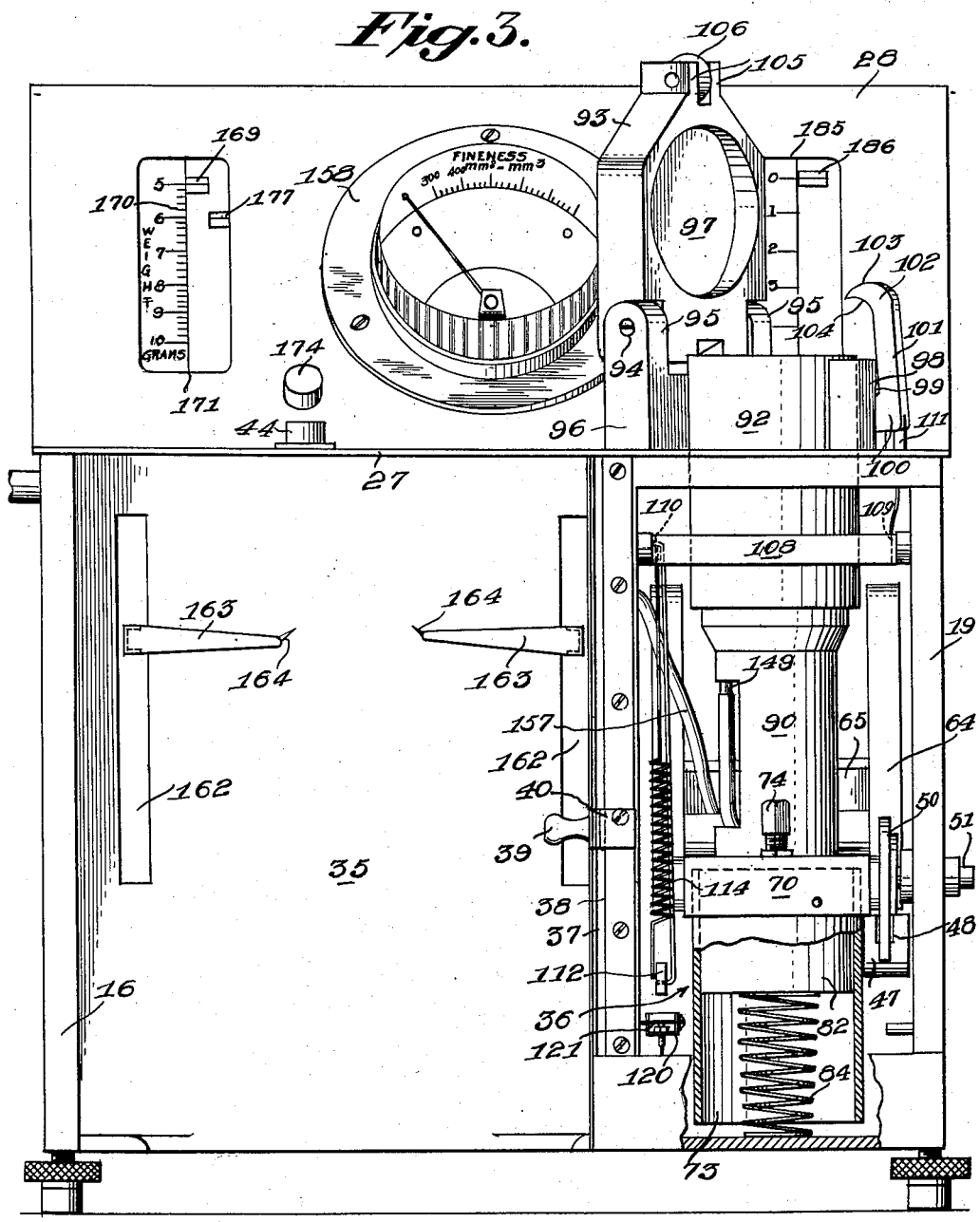
Figure 3 is a front elevational view of the device shown in a fiber loading position.

Such means preferably comprises a generally rectangular lid 93 of substantial thickness and which at one end thereof is pivotally secured as at 94 to the ears 95 of a block 96 rigid with and projecting upwardly from said panel portion 27. Suitable spring means is embodied in the pivotal connection for normally retaining the lid in yieldable upright position as is indicated in Figure 3.

The lid 93 is provided on its under side with a circular depression 97 in which the upper end of cylinder 92 is received in air-tight relation when the lid is in horizontal closed position as shown in Figure 1.

A post 98 projects upwardly from panel portion 27 adjacent the upwardly projecting end of cylinder 92 and in diametrically opposed relation to the lid pivoting block 96.

The post is provided with a vertical slot 99 in which is pivotally supported the short arm 100 of a right angular latch whose longer arm 101 extends upwardly along the post 98 and the upper end of arm 101 which is disposed substantially above the top of post 98 is provided with an inwardly directed hook 102 having a convex upper camming surface 103 and a lower concave locking surface 104. The lid 93 includes a pair of spaced ears 105 between which is pivotally supported a camming roller 106 which roller upon manually closing the lid engages the upper convex surface 103 of the latch and forces same outwardly against yieldable means later referred to which normally holds the latch in its locking position and after the latch has been cammed outwardly by the roller 106 it immediately snaps back with the concave surface 104 thereof engaged with the upper portion of the roller.

The said yieldable means effective to normally retain the latch in lid closing position comprises a shaft 107 disposed adjacent the top of compartment 36 in transverse relation to plates 18 and 19 and having its opposite ends secured therein.

An elongated member 108 is provided with right angularly disposed end portions 109 and 110 which are pivotally supported on the shaft 107. A short metallic ribbon 111 provides a connection between the end portion 109 and the latch 102 whereby upon clockwise rotation of the member 108 and end portions 109 and 110 the latch 102 will be pulled outwardly away from the lid supported roller 106 with a resulting snap action opening of the lid.

A lever 112 is disposed within compartment 36 adjacent the bottom thereof and is pivotally connected intermediate its ends to the plate 18 as indicated at 113.

A vertically disposed coil spring 114 has a relatively long upper end 115 which is connected to the shaft 107 and a relatively short lower end 116 which is selectively engageable within one of a plurality of apertures 117 in the outer end of the lever 112.

The spring 114 accordingly reacts in a manner tending to rotate lever 112 clockwise.

An elongated wire 118 has the upper end thereof extended through an aperture 119 in the end portion 110 and the lower end thereof extends through one of said apertures 117 in the lever 112.

Thus, upon clockwise rotation of lever 112 wire 118 will impart counter-clockwise rotation to end portion 109 with a resulting lid closing position of the latch 102. Should counterclockwise rotation be imparted to lever 112 wire 118 will be drawn downward with a resulting release of the latch 102 through the end portion 109 and the metallic ribbon 111.

Since it is desirable to provide for automatic opening of the lid 93 at a time when piston 90 is approximately at the lower limit of its stroke automatically operable means is provided for momentarily imparting counter-clockwise rotation to the lever 112 about its pivot 113. Such means in accordance with a preferred structural embodiment thereof comprises an elongated channel member 120 disposed beneath the lever 112 and which is confined to longitudinal sliding movement by means of a pair of studs 121 projecting inwardly from the plate 18 and through longitudinally elongated slots 122 in the opposite side walls of the channel member.

The channel member is normally retained in a position wherein the studs 121 engage the forward ends of slots 122 by means of a coil spring 123 whose one end is secured to the frame as at 124 and whose opposite end is secured to a depending pin 125 having a rigid connection with the channel member 120.

A pair of arms 126 have their lower ends disposed within and pivotally secured to the side walls of the channel member 120 as indicated at 127 and a torsion coil spring 128 encircles the pivot shaft 127 and acts to normally retain the arms 126 in contact with a stop pin 129 extending through the side walls of the channel member.

The rear end of lever 112 is inwardly bevelled as indicated at 130 and which is normally engaged by a roller 131 rotatably supported between the outer ends of arms 126. When the piston 90 is in its lowermost position the roller 131 will be disposed in a downwardly facing recess 132 in the lever 112 and it is to be noted that the latch 102 will be in lid closing position in either the full line or dotted line position of the roller 131 indicated in Figure 5.

Figure 5:
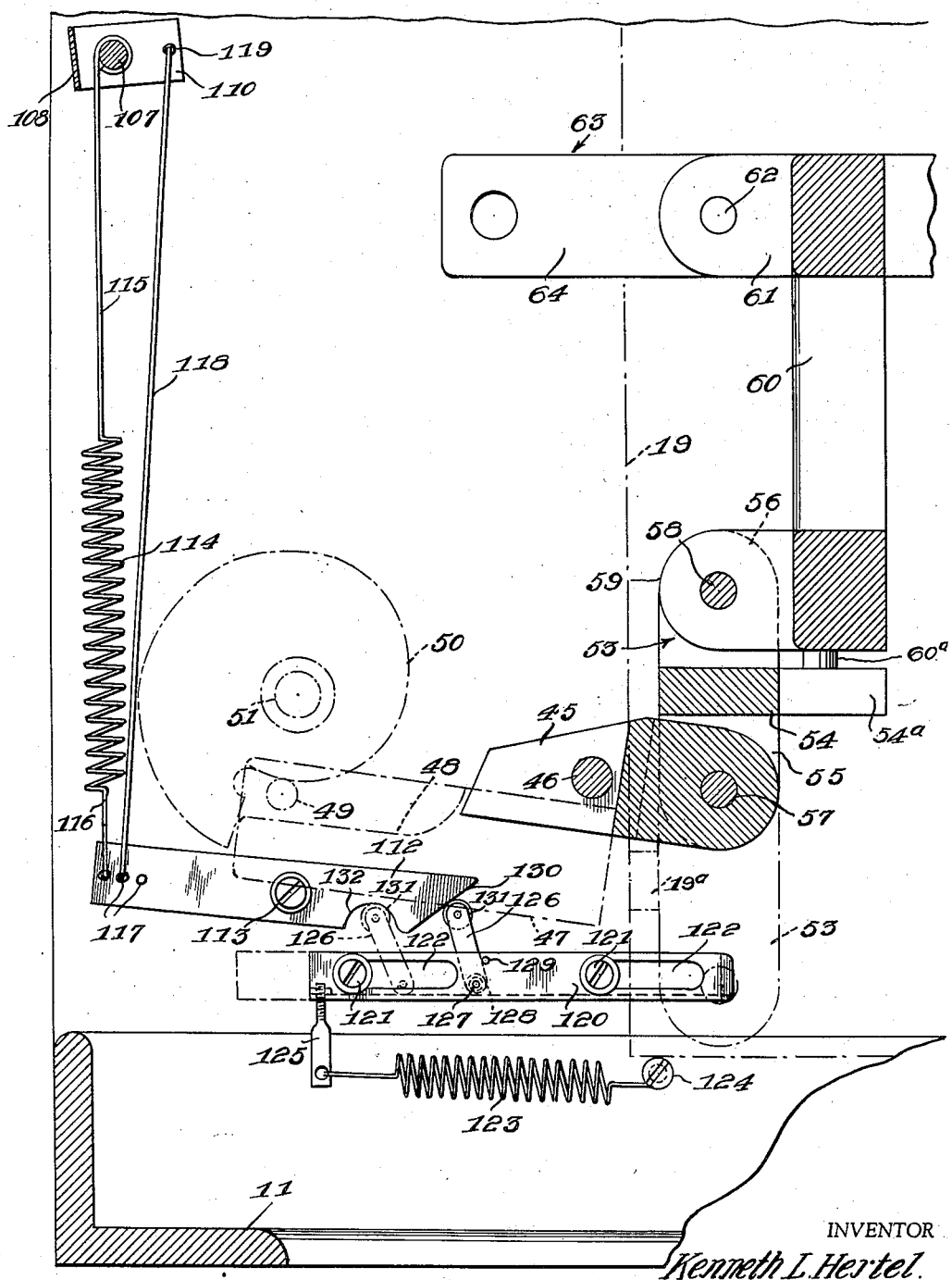
Figure 5 is a substantially enlarged fragmental vertical sectional view as observed substantially in the plane of line 5—5 of Figure 4 with the piston and cylinders omitted for clarity of illustration of a lid latch operating mechanism involved in the invention.

In the upper fiber-compressing position of the piston 90 the arms 126 and roller 131 will be in the solid line position shown in Figure 5.

The arms and roller will remain in this position until the piston 90 has substantially reached the lowermost limit of its stroke whereupon the member 53 will engage the rear end of channel member 120 and move same forward against the resistance of spring 123. The roller 131 will accordingly ride on the tapered end 130 of the lever 112 and move the lever counter-clockwise with a resulting release of the latch 102 and an automatic opening of the lid 93 whereby the upper end of cylinder 92 is open for the reception of a mass of fibers to be compressed and tested. Obviously, the lid 93 must be manually closed preparatory to a fiber compressing action.

Upon upward movement of the piston the member 53 will be moved away from the rear end of the channel member and the spring 123 will automatically restore the channel member to its normal solid line position in Figure 5.

The above-referred-to air distribution means 91 includes an outer member 136 and an inner member 137.

The outer member 136 seats directly on the upper end of piston 90 which is provided with a diametrical air admission recess 90a. The member 136 is of generally cylindrical external form but wherein the upper portion thereof is of greater diameter than the upper end of piston 90 and the outer wall of the member converges downwardly from said upper cylindrical portion to the circumference of the upper end of piston 90.

The cylindrical top portion is provided with a plurality of plastic buttons 138 which bear on the inner wall of cylinder 92 and this member is provided with a relatively large upwardly opening recess 139, the bottom wall of which is provided with a central aperture 140 and a plurality of concentrically disposed apertures 141, all of which apertures extend through the base of the recess. The relatively thick rim 142 of the member 136 is provided with a relatively narrow flange 143 which overhangs the said recess.

This member 136 is further provided iwth a nozzle 144 whose upper end is disposed within said recess 139 and whose lower end projects substantially below the member and is disposed within the upper end of a bore 145 in said piston 90, the lower end of which communicates with an aperture 146 in the top wall of block 70.

The said nozzle 144 is preferably provided with an O-ring 147 to provide an air-tight connection between same and said bore 145. The nozzle is provided with a bore 144a and which intersects an inwardly opening slot 144b in the upper end of the nozzle as is indicated in Figure 10.

The member 136 is further provided with an aperture 148 communicating with the recess 139 for receiving a downwardly extending nozzle 149 and the said member is further provided in the base of recess 139 with an air sealing O-ring 150 which is in encircling relation to said apertures 140 and 141.

The inner member 137 includes a cylindrical portion 151 whose base rests on said O-ring 150 and which portion 151 is of less diameter than that of said recess 139 thereby providing a circumferential air space 152 between the members 136 and 137.

The member 137 is provided with a circular recess 153 in its outer end and a plurality of apertures 154 extend through the member and open through the base of recess 153.

The said apertures are of the same spacing relative to the axis of member 137 as are the apertures in member 136 and a screw 155 extends through the aligned central apertures in the members 136, 137 and whose inner end is threaded into a tapped opening 156 in the upper end of piston 90 for removably retaining the members 136 and 137 in operative position.

The above-referred-to nozzle 149 has the lower projecting end thereof disposed within one end of a flexible tube 157 whose opposite end is operatively connected to a fiber fineness indicating dial or gauge 158 suitably secured to the panel portion 28. This indicating device responds to differences in air pressure, as caused, for example, by suction.

A fiber weighing scale 160 is disposed within the housing defined by said frame and panels rearwardly of the compartment 35 and same generally comprises a pair of beams 161 which adjacent their forward ends extend through vertical slots 162 in the panel 33. The forward ends of the beams are laterally bent inwardly towards each other in the provision of fingers 163 which are preferably tapered toward their extremities.

A cotton retaining pointed pin 164 extends inwardly and slightly upwardly from the end of each finger 163. The rear ends of the scale beams 161 are pivotally supported on a shaft 165, and the beams are balanced by a counterweight 161a. The opposite ends of shaft 165 are fixed in lugs 166 and 167 which extend inwardly from frame members 13 and 14.

The scale further includes a pointer arm 168 rigid with beams 161 and having a pointer 169 on its free end which is movable along a weight indicating means 170 at one side of a glass covered opening 171 in said panel portion 28 and at one side of the dial 158.

The scale beams are spring actuated and include spring adjusting means 172 which are controlled by a Bowden wire 173 upon rotation of a knob 174 on the panel portion 28.

Rotatably supported on the shaft 165 is an elongated plate 175 to which is secured one end of a beam 176 whose opposite end is provided with a pointer 177 which is movable along the indicating means 170 at the opposite side of the opening 171.

Means are provided for moving the beam 176 commensurate with the adjustment of the bearing member 45 and for this purpose an arm 180 has one end thereof secured to the plate 175. The arm 180 is provided with a longitudinal slot 181 in which is adjustably supported one end of a vertically disposed turnbuckle 182. The opposite end of the turnbuckle is adjustably connected in a longitudinal slot 183 in one end of an arm 184 and the opposite end of said arm is rigidly connected to the bearing member 45 whereby the scale beam 176 is moved simultaneously with the vertical adjustment of the piston 90.

Means are also provided for indicating the pressure on the successively compressed fiber samples on an indicating means 185 through movement of a pointer 186 on the outer end of a beam 187 whose inner end is secured to a stirrup 188, which is pivotally connected to a block 189 rigid with the frame.

The pivotal connections of the rear ends of bars 64 are effected by the referred-to pins 66 which extend into the downwardly directed ears of said stirrup 188 in axially aligned relation and the stirrup is pivotally secured to the block 189 by a pin 190 which extends through the block 189 and said ears of the stirrup, the pin 190 being offset from pins 66 as is indicated in Figures 1 and 4.

By this particular structure the beam 63 is swingable about the pins 66 without pivotal movement of the stirrup 188 about the pin 190 in the vertical movements of the piston 90 so long as the piston is not subjected to downward pressure.

However, upon the compression of a mass of fibers between the air distributing means 91 and the bottom wall of the lid 93, the piston 90 will be subjected to downward pressure and in which event the beam 63 to the right of the link 60 will move upward slightly about the pivotal connection thereof with the upper end of the link with a resulting counter-clockwise rotation of the stirrup 188 about the pivot pin 190 and such movement of the stirrup will move the beam 187 downward and the pointer 186 thereon will indicate the the packing modulus on the indicator 185. An elongated arm 191 has one end thereof rigidly secured to the stirrup 188 and the opposite end thereof is movable within a channel 192. A cushion block 193 is supported within said channel 192 adjacent each end thereof and a coil spring 194 has one end thereof connected to said arm 191 and the other end thereof connected to a plate 195 which is vertically adjustable by means of a Bowden wire 196 which is operable by a knob 197 on the panel portion 28. While not specifically shown, the weighing scale 160 includes a coil spring and its adjustment is effected by the Bowden wire 173 similar to the adjustment effected by the Bowden wire 196.

Having set forth a preferred structural embodiment of this instrument, the operation thereof is as follows—

With the piston 90 in its lowered position as in Figure 3 and with the lid 93 in raised position as shown in said figure, an operator grasps a sample of compressible fibers and suspends same from the pins 164 on the scale beams 161 with a resulting movement of the pointer 169 to a position on the indicator 170 between the gram markings 5 and 10.

While the skill of an experienced operator will enable him or her to grasp successive samples of fiber having a weight range between 5 grams and 10 grams, the exact weights of the successive samples will nevertheless vary substantially and in order to ascertain the relative resistance to fluid flow of the successive samples it is necessary that same be subjected to the same compression upon upward movement of piston 90 within the cylinder 92, and accordingly while the strokes of the piston are constant, the range thereof, that is, the position from which each stroke begins, is variable for different weight samples, so that, the heavier the sample the lower is the piston range with the piston both starting and stopping at lower points axially of the cylinder.

In order to satisfy such condition, the operator will grasp the hand wheel 52 and rotate same in such direction as to bring the pointer 177 into transverse alignment with the sample weight indicating pointer 169 and which rotation of the hand wheel will correspondingly raise or lower the piston 90 by the means heretofore described.

The operator will then place the fiber sample within this open upper end of the cylinder 92 and manually close the lid 93. With the piston 90 in this pre-compressing position the cylinder 73 will be in its lowermost position and the gravity piston 82 will be held at the upper end of the cylinder 73 by means of the coil spring 84, the relief valve 75 permitting upward movement of piston 82 in cylinder 73.

The operator will next grasp the handle 69 and swing same forwardly as in Figure 4 with a resulting upward compression stroke of the piston 90 within the cylinder 92, and the fiber sample in said cylinder will be compressed between the air circulating means 91 and the cylinder lid 93. Upon such upward movement of piston 90, the cylinder 73 will be elevated simultaneously therewith and the gravity piston 82 will relatively slowly descend within this cylinder.

The descent of the gravity piston 82 in cylinder 73 will create suction in the bore 145 in piston 90 with a resulting movement of atmospheric air through the recess 90a in the top of piston 90, and thence through the apertures 141 in the outer member 136 of the air circulating means 91, through the aperture 154 in the inner member 137 of the air circulating means and thence upwardly through the circular opening between the wall of recess 153 and the circumferential edge of the head of screw 155, as is indicated in Figure 15.

This stream of air will pass in arcuate pairs through the base of the compressed fiber sample F and into the circumferential gap between the inner and outer members 136 and 137 and thence into the circumferential air space 152. Furthermore, suction in the bore 145 will be transmitted through the flexible tube 157, thus operating the fineness indicating dial or gauge 158, it being understood that the degree of suction applied to the tube 157 will vary with the amount of air passing through the compressed fiber, and this will be inversely proportional to its fineness. The speed of descent of the gravity piston 82 may be regulated by the rate air valve 74 as well as the weight 88 on the bottom wall of the piston which may be in position in the recess 87 as shown in Figures 13 and 14 or altogether removed.

The beam 63 swings freely on the pivot pins 66 so long as no resistance is offered to the upward movement of piston 90. However, when resistance is offered as by means of compression of the fiber F as indicated in Figure 15, the piston will be subjected to downward pressure and the rear end of the beam will pivot upwardly about the pin 58 and since pins 66 are eccentric to pivot pin 190, the stirrup 188 will be swung counter-clockwise with a resulting downward movement of the pointer 186 to give the compression reading on the indicator 185.

From the foregoing, it will be seen that I have provided apparatus of the kind referred to in which all samples of widely varying weights of material to be tested are compressed to a constant density, regardless of their weight, so that the resistance to fluid flow offered by successive samples to determine their relative fineness may be accurately compared, and in which separate means are provided for indicating the stiffness or compressibility of the samples, and it is thought that the many advantages of the invention will be readily appreciated by those familiar with such matters.

What I claim is:

1. Apparatus for determining the relative resistance to fluid flow of various samples of compressible fibrous material of different weights comprising a compression chamber to receive the samples, means for first adjusting the size of said chamber, means for indicating when the size has been adjusted in direct proportion to the weight of each sample, means for then compressing the sample in said chamber to a predetermined extent, and means for establishing a flow of fluid through the compressed sample.

2. Apparatus for determining the relative resistance to fluid flow of various samples of compressible fibrous material of different weights comprising a compression chamber to receive the samples, means for first adjusting the size of said chamber, means for indicating when the size has been adjusted in direct proportion to the weight of each sample, means for then compressing the sample in said chamber by reducing its volume by the same actual amount in every case, whereby the density of the compressed mass is the same for all samples, and means for establishing a flow of fluid through the compressed sample.

3. Apparatus for determining the relative resistance to fluid flow of various samples of compressible fibrous material of different weights comprising a compression chamber to receive the samples, means for subjecting each sample in said chamber to a definite predetermined amount of compression in such manner that the density of the compressed mass is the same for all samples regardless of their weight, and regardless of the size or stiffness of the fibers, and means for establishing a flow of fluid through the compressed sample.

4. Apparatus for determining the relative resistance to fluid flow of various samples of compressible fibrous material of different weights comprising a compression chamber to receive the samples, means for compressing each sample in said chamber, said means operating to automatically compress each sample to a pre-determined volume which is directly proportional to its weight, and means for establishing a flow of fluid through the compressed sample.

5. Apparatus for determining the relative resistance to fluid flow of various samples of compressible fibrous material of different weights comprising a compression chamber to receive the samples, said chamber being in the form of a cylinder having a closed end and a piston movable in said cylinder, means for first adjusting said piston to a position in which the volume of the cylinder between said piston and closed end is directly proportional to the weight of the sample, means for indicating when said piston has reached the correct position, means for then moving said piston toward said end, said means being constructed to automatically move said piston a distance which is the same for all samples, whereby all samples are compressed to masses of uniform density, and means for establishing a flow of fluid through said compressed samples.

6. Apparatus for determining the relative resistance to fluid flow of various samples of compressible fibrous material of different weights comprising a compression chamber to receive the samples, means for testing the weight of each sample comprising a pointer movable in response to such weight, means for adjusting the size of said chamber in direct proportion to the weight of each sample, a second pointer, mounted adjacent the first, means interconnecting said adjusting means with said second pointer in such manner that when the size of said chamber is properly adjusted, said two pointers are in registry, means for compressing the sample in said chamber, and means for establishing a flow of fluid through the compressed chamber.

7. Apparatus for determining the relative resistance to fluid flow of various samples of compressible fibrous material of different weights comprising a compression chamber to receive the samples, means for first adjusting the size of said chamber in direct proportion to the weight of each sample, means for indicating when such adjustment has been properly made, means for compressing the sample in said chamber, said means operating in such manner as to automatically cause the density of the compressed mass to be the same for all samples, and means for establishing a flow of fluid through the compressed sample.

8. In self-contained apparatus for determining the resistance to fluid flow offered by a sample of compressible fibrous material, a compression chamber means for compressing the sample in said chamber to a mass of suitable density, and means for creating a pressure difference between two points of said mass, said means comprising a vertical cylinder movable with said compressing means having therein a free, weighted piston, mechanical means for momentarily raising said piston, and means operated solely by the descent of said piston under the influence of gravity for producing the desired pressure difference.

9. In self-contained apparatus for determining the resistance to fluid flow offered by a sample of compressible fibrous material, means for compressing the sample to a mass of suitable density, and means for creating a pressure difference between two points of said mass, said means comprising a vertical cylinder having therein a free, weighted piston, and frictionally engaging said cylinder, a support for normally holding said piston near the upper end of said cylinder, mechanical means for quickly raising said cylinder and piston together a predetermined distance and thus lifting said piston off of said support, and means operated solely by said piston as it settles slowly downward toward said support under the influence of gravity for producing the desired pressure difference.

10. Apparatus for determining the relative resistance to fluid flow of samples of compressible fibrous material comprising a compression chamber to receive the samples, said chamber being in the form of a cylinder having an open end, a manually operable, pivotally mounted lid for closing said end, said lid being biased to open position, a latch for holding said lid in closed position, a piston movable in said cylinder to compress the samples between itself and said lid, means for operating said piston, and automatic means for releasing said latch when said piston is moved to a position remote from said lid.

11. Apparatus for determining the relative resistance to fluid flow of samples of compressible fibrous material comprising a compression chamber to receive the samples, said chamber being in the form of a vertically disposed cylinder having its upper end open, a manually operated lid, pivotally mounted on a horizontal axis, for closing said end, spring means tending to swing said lid to open position, a latch for holding said lid in closed position, a spring for maintaining said latch in engagement with said lid, a piston movable in said cylinder to compress the samples between itself and said lid, means for operating said piston, and automatic means for disengaging said latch and permitting said spring means to move said lid to open position when said piston is retracted to approximately the lower limit of its travel.

12. Apparatus for testing various samples of compressible fibrous material comprising a compression chamber to receive the samples, means for compressing said samples in said chamber to a uniform density, means for indicating the relative resistance to fluid flow offered by successive compressed samples and thus determining the factor of relative fineness, and separate means for indicating the compressive force applied to each sample and thus determining a factor related to the property of stiffness.

13. Apparatus for testing various samples of compressible fibrous material comprising a compression chamber to receive the samples, said chamber being in the nature of a cylinder, means including a piston movable in said cylinder for compressing said samples to a uniform density means for indicating the relative resistance to fluid flow offered by successive compressed samples and thus determining the factor of relative fineness, a separate indicating device, and means mechanically connecting said piston with said indicating device, in such manner that said device responds to the magnitude of the compressive force applied to each sample, whereby a factor related to the property of stiffness is determined.

References Cited in the file of this patent
UNITED STATES PATENTS

| | | |
|---|---|---|
| 1,649,287 | Butler | Nov. 15, 1927 |
| 2,352,835 | Hertel | July 4, 1944 |
| 2,352,836 | Hertel | July 4, 1944 |
| 2,365,496 | Shaw | Dec. 19, 1944 |
| 2,462,014 | Welge | Feb. 15, 1949 |
| 2,641,460 | Larson | June 9, 1953 |
| 2,658,745 | Howard | Nov. 10, 1953 |
| 2,706,904 | Hertel | Apr. 26, 1955 |